United States Patent
Nakamura et al.

(10) Patent No.: US 9,573,205 B2
(45) Date of Patent: Feb. 21, 2017

(54) ROTARY CUTTING APPARATUS AND ROTARY CUTTING METHOD

(75) Inventors: Akihiko Nakamura, Anjo (JP); Kazuhiro Hanaki, Tahara (JP); Mahito Nakamura, Tahara (JP); Hiroshi Uchida, Anjo (JP); Narihiro Minami, Tahara (JP)

(73) Assignee: CVTEC CO., LTD., Aichi-ken (JP)

( * ) Notice: Subject to any disclaimer, the term of this patent is extended or adjusted under 35 U.S.C. 154(b) by 267 days.

(21) Appl. No.: 14/365,189

(22) PCT Filed: Feb. 28, 2012

(86) PCT No.: PCT/JP2012/054970
§ 371 (c)(1),
(2), (4) Date: Jun. 13, 2014

(87) PCT Pub. No.: WO2013/128579
PCT Pub. Date: Sep. 6, 2013

(65) Prior Publication Data
US 2014/0331836 A1    Nov. 13, 2014

(51) Int. Cl.
  *B23D 21/14*    (2006.01)
  *B23D 21/00*    (2006.01)
  *B23D 35/00*    (2006.01)

(52) U.S. Cl.
  CPC .............. *B23D 21/00* (2013.01); *B23D 21/14* (2013.01); *B23D 35/001* (2013.01); *Y10T 83/0596* (2015.04); *Y10T 83/384* (2015.04)

(58) Field of Classification Search
  CPC ....... B23D 21/00; B23D 21/14; B23D 35/001; Y10T 83/0596; Y10T 83/384

(Continued)

(56) References Cited

U.S. PATENT DOCUMENTS

| | | | | |
|---|---|---|---|---|
| 3,190,094 A | * | 6/1965 | Kutas | B23D 21/14 225/103 |
| 3,756,103 A | * | 9/1973 | Cvacho | B23D 21/14 82/101 |
| 5,823,255 A | * | 10/1998 | Swiatowy | E21B 29/005 166/55.1 |

FOREIGN PATENT DOCUMENTS

| | | |
|---|---|---|
| JP | 2009-262289 A | 11/2009 |
| JP | 2010-052113 A | 3/2010 |
| JP | 2010-064177 A | 3/2010 |

OTHER PUBLICATIONS

International Search Report of PCT/JP2012/054970 dated Apr. 3, 2012.

\* cited by examiner

*Primary Examiner* — Omar Flores Sanchez
(74) *Attorney, Agent, or Firm* — Sughrue Mion, PLLC

(57) ABSTRACT

A rotary cutting apparatus includes a pair of cutting tools each having a cutting blade along a tip end of its outer peripheral portion having a mountain-shaped cross section, and cuts a cylindrical material into pieces with a predetermined width by sandwiching the cylindrical material between the cutting blades so the cutting blades are respectively placed on inner and outer peripheries of the cylindrical material, and relatively rotating and moving the pair of cutting tools along an entire circumference of the cylindrical material. A second imaginary line connecting an axial center of the cylindrical material and an axial center of the inner peripheral-side cutting tool is shifted in a circumferential direction of the cylindrical material about the axial center of the cylindrical material with respect to a first imaginary line connecting the axial center of the cylindrical material and an axial center of the outer peripheral-side cutting tool.

8 Claims, 9 Drawing Sheets

ROTARY CUTTING APPARATUS AND ROTARY CUTTING METHOD

CROSS REFERENCE TO RELATED APPLICATIONS

This is a National Stage of International Application No. PCT/JP2012/054970 filed Feb. 28, 2012, the content of all of which is incorporated herein by reference in its entirety.

TECHNICAL FIELD

The present invention relates to rotary cutting apparatuses and rotary cutting methods for cutting a cylindrical material with a pair of cutting tools into pieces with a predetermined width.

BACKGROUND ART

Annular loop members etc. that are used as power transmission means of automatic transmissions are manufactured by cutting a cylindrical material into pieces with a predetermined width. This cutting of the cylindrical material is performed by sandwiching a circumferential portion of the cylindrical material between cutting blades of the pair of cutting tools that are placed on the inner and outer peripheries of the cylindrical material, and by relatively rotating and moving the pair of cutting tools along the entire circumference of the cylindrical material.

An example of such rotary cutting apparatuses is a cutting apparatus for a metal thin plate drum which is disclosed in Patent Document 1. In this cutting apparatus, a pair of mountain-shaped rolling cutters are made to contact the outer and inner peripheral surfaces of the drum, and a servomotor is driven to rotate the drum held by a pressure contact member. The pair of rolling cutters rotate together with the drum, whereby the drum can be cut.

RELATED ART DOCUMENT

Patent Document

[Patent Document 1] Japanese Patent Application Publication No. 2010-64177 (JP 2010-64177 A)

SUMMARY OF THE INVENTION

Problem to be Solved by the Invention

The conventional rotary cutting apparatuses, however, hold one end of the cylindrical material, and the other end of the cylindrical material is a free end. Accordingly, an end face shape that is formed in the tip end of the cylindrical material is different from an end face shape that is formed in the side which is cut off of the cylindrical material. Specifically, the amount of deformation in the axial direction of the cylindrical material is different between the tip end and the side which is cut off of the cylindrical material, and the end face shape that is formed in the side which is cut off of the cylindrical material is more elongated than the end face shape that is formed in the tip end of the cylindrical material. This requires a large amount of polishing so that both end faces of the cut loop member have the same shape.

The present invention was developed in view of the conventional problem, and it is an object of the present invention to provide a rotary cutting apparatus and a rotary cutting method which can significantly reduce the amount of polishing that is performed to make both end faces of the cut loop member have the same shape and which can prolong the life of the pair of cutting tools.

Means for Solving the Problem

According to a first invention, a rotary cutting apparatus including a pair of cutting tools each having a cutting blade along a tip end of its outer peripheral portion having a mountain-shaped cross section, in which the rotary cutting apparatus cuts a cylindrical material into pieces with a predetermined width by sandwiching the cylindrical material between the cutting blades of the pair of cutting tools so that the cutting blades are respectively placed on inner and outer peripheries of the cylindrical material, and relatively rotating and moving the pair of cutting tools along an entire circumference of the cylindrical material, is characterized in that the rotary cutting apparatus cuts the cylindrical material in a state where a second imaginary line connecting an axial center of the cylindrical material and an axial center of an inner peripheral-side cutting tool as one of the pair of cutting tools which is placed on the inner periphery of the cylindrical material is shifted in a circumferential direction of the cylindrical material about the axial center of the cylindrical material with respect to a first imaginary line connecting the axial center of the cylindrical material and an axial center of an outer peripheral-side cutting tool as the other cutting tool that is placed on the outer periphery of the cylindrical material.

According to a second invention, a rotary cutting method in which a pair of cutting tools are provided each having a cutting blade along a tip end of its outer peripheral portion having a mountain-shaped cross section, and a cylindrical material is cut into pieces with a predetermined width by sandwiching the cylindrical material between the cutting blades of the pair of cutting tools so that the cutting blades are respectively placed on inner and outer peripheries of the cylindrical material, and relatively rotating and moving the pair of cutting tools along an entire circumference of the cylindrical material, characterized in that the cylindrical material is cut in a state where a second imaginary line connecting an axial center of the cylindrical material and an axial center of an inner peripheral-side cutting tool as one of the pair of cutting tools which is placed on the inner periphery of the cylindrical material is shifted in a circumferential direction of the cylindrical material about the axial center of the cylindrical material with respect to a first imaginary line connecting the axial center of the cylindrical material and an axial center of an outer peripheral-side cutting tool as the other cutting tool that is placed on the outer periphery of the cylindrical material.

Effects of the Invention

In the rotary cutting apparatus of the first invention, the cylindrical material is cut in the state where the second imaginary line connecting the axial center of the cylindrical material and the axial center of the inner peripheral-side cutting tool is shifted in the circumferential direction of the cylindrical material about the axial center of the cylindrical material with respect to the first imaginary line connecting the axial center of the cylindrical material and the axial center of the outer peripheral-side cutting tool. Thus, the cut portion of the cylindrical material which is sandwiched between the pair of cutting tools is subjected to such a bending force that deforms the cut portion into a wave shape having an S-shape in a radial direction of the cut portion.

That is, the cut portion of the cylindrical material can be elastically deformed in the radial direction even if deformation in the axial direction is restricted. This can minimize the difference between an end face shape that is formed in the tip end of the cylindrical material and an end face shape that is formed in the side which is cut off of the cylindrical material. This can significantly reduce the amount of polishing that is performed to make both end faces of the cut loop member have the same shape.

Since the cut portion of the cylindrical material is subjected to such a bending force that deforms the cut portion into a wave shape having an S-shape in the radial direction of the cut portion, a maximum load that is applied to each cutting blade of the pair of cutting tools can be reduced. Moreover, since this bending force is repeatedly applied to the cylindrical material in the end stage of the cutting operation, the cylindrical material can be cut off before the cutting blades of the pair of cutting tools contact each other. This can prolong the life of the pair of cutting tools.

Therefore, according to the rotary cutting apparatus of the first invention, the amount of polishing that is performed to make both end faces of the cut loop member have the same shape can be significantly reduced, and the life of the pair of cutting tools can be prolonged.

According to the rotary cutting method of the second invention, as in the invention of the rotary cutting apparatus, the amount of polishing that is performed to make both end faces of the cut loop member have the same shape can be significantly reduced, and the life of the pair of cutting tools can be prolonged.

MODES FOR CARRYING OUT THE INVENTION

Figure 1:
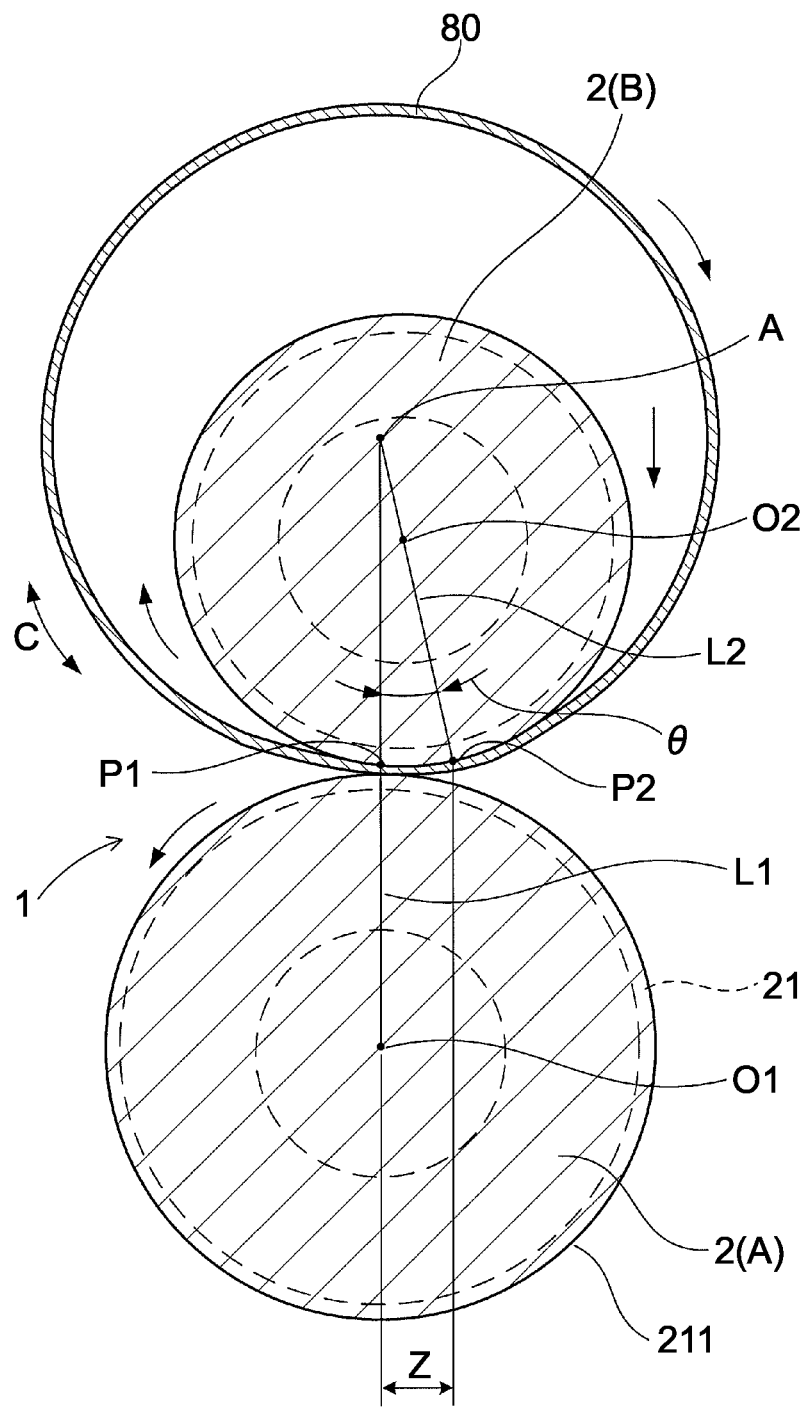
FIG. 1 is a sectional illustration showing the state where a cylindrical material is cut with a pair of cutting tools according to an embodiment, as viewed in an axial direction of the cylindrical material.

Preferred embodiments of the rotary cutting apparatus and the rotary cutting method of the above first and second inventions will be described below.

In the first invention, it is preferable that the rotary cutting apparatus include: rotation holding means for holding the cylindrical material so that the cylindrical material can rotate about a central axis of the cylindrical material, and cutting tool feed means for holding the pair of cutting tools so that each of the cutting tools can spin, and relatively moving the pair of cutting tools toward each other, and the rotary cutting apparatus cut the cylindrical material by rotating the cylindrical material by the rotation holding means, moving the pair of cutting tools toward each other by the cutting tool feed means, and driving the pair of cutting tools into rotation according to the rotation of the cylindrical material.

In the second invention, it is preferable that the rotary cutting method use rotation holding means for holding the cylindrical material so that the cylindrical material can rotate about a central axis of the cylindrical material, and cutting tool feed means for holding the pair of cutting tools so that each of the cutting tools can spin, and relatively moving the pair of cutting tools toward each other, and the cylindrical material be cut by rotating the cylindrical material by the rotation holding means, moving the pair of cutting tools toward each other by the cutting tool feed means, and driving the pair of cutting tools into rotation according to the rotation of the cylindrical material.

In these cases, cutting of the cylindrical material can be stably performed by driving the pair of cutting tools into rotation according to the rotation of the cylindrical material.

In the first invention, it is preferable that a tip end of each cutting blade of the pair of cutting tools be formed to have a flat surface or a rounded surface, and the rotary cutting apparatus cut off the cylindrical material by relatively separating the pair of cutting tools and the rotation holding means in an axial direction of the cylindrical material before the cutting blades of the pair of cutting tools contact each other during cutting of the cylindrical material.

In the second invention, it is preferable that a tip end of each cutting blade of the pair of cutting tools be formed to have a flat surface or a rounded surface, and the cylindrical material be cut off by relatively separating the pair of cutting tools and the rotation holding means in an axial direction of the cylindrical material before the cutting blades of the pair of cutting tools contact each other during cutting of the cylindrical material.

In these cases, the cut portion of the cylindrical material can be forcibly cut off in the end stage of the cutting operation of the cylindrical material, which can reduce the time required to cut the cylindrical material.

In the first and second inventions, it is preferable that an angle of the second imaginary line with respect to the first imaginary line be in a range of 2 to 21°.

In this case, the advantage that the shift amount between the first imaginary line and the second imaginary line is appropriate and the amount of polishing that is performed after cutting can be significantly reduced, and the advantage that the life of the pair of cutting tools can be prolonged can be more significantly achieved.

Embodiment

An embodiment of a rotary cutting apparatus and a rotary cutting method of the present invention will be described below with reference to the accompanying drawings.

As shown in FIG. 1, a rotary cutting apparatus 1 of the present embodiment includes a pair of cutting tools 2 each having a cutting blade 211 along the tip end of its outer peripheral portion 21 having a mountain-shaped cross section. The rotary cutting apparatus 1 cuts a cylindrical material 80 into pieces with a predetermined width by sandwiching the cylindrical material 80 between the cutting blades 211 of the pair of cutting tools 2A, 2B so that the cutting blades 211 are respectively placed on the inner and outer peripheries of the cylindrical material 80, and relatively rotating and moving the pair of cutting tools 2A, 2B along the entire circumference of the cylindrical material 80. The rotary cutting apparatus 1 is configured to cut the cylindrical material 80 in the state where a second imaginary line L2 connecting an axial center A of the cylindrical material 80 and an axial center O2 of the inner peripheral-side cutting tool 2B as one of the pair of cutting tools 2A, 2B which is placed on the inner periphery of the cylindrical material 80 is shifted in a circumferential direction C of the cylindrical material 80 about the axial center A of the cylindrical material 80 with respect to a first imaginary line L1 connecting the axial center A of the cylindrical material 80 and an axial center O1 of the outer peripheral-side cutting tool 2A as the other cutting tool 2A, 2B that is placed on the outer periphery of the cylindrical material 80.

The rotary cutting apparatus 1 and the rotary cutting method of the present embodiment will be described below with reference to FIGS. 1 to 9.

Figure 2:
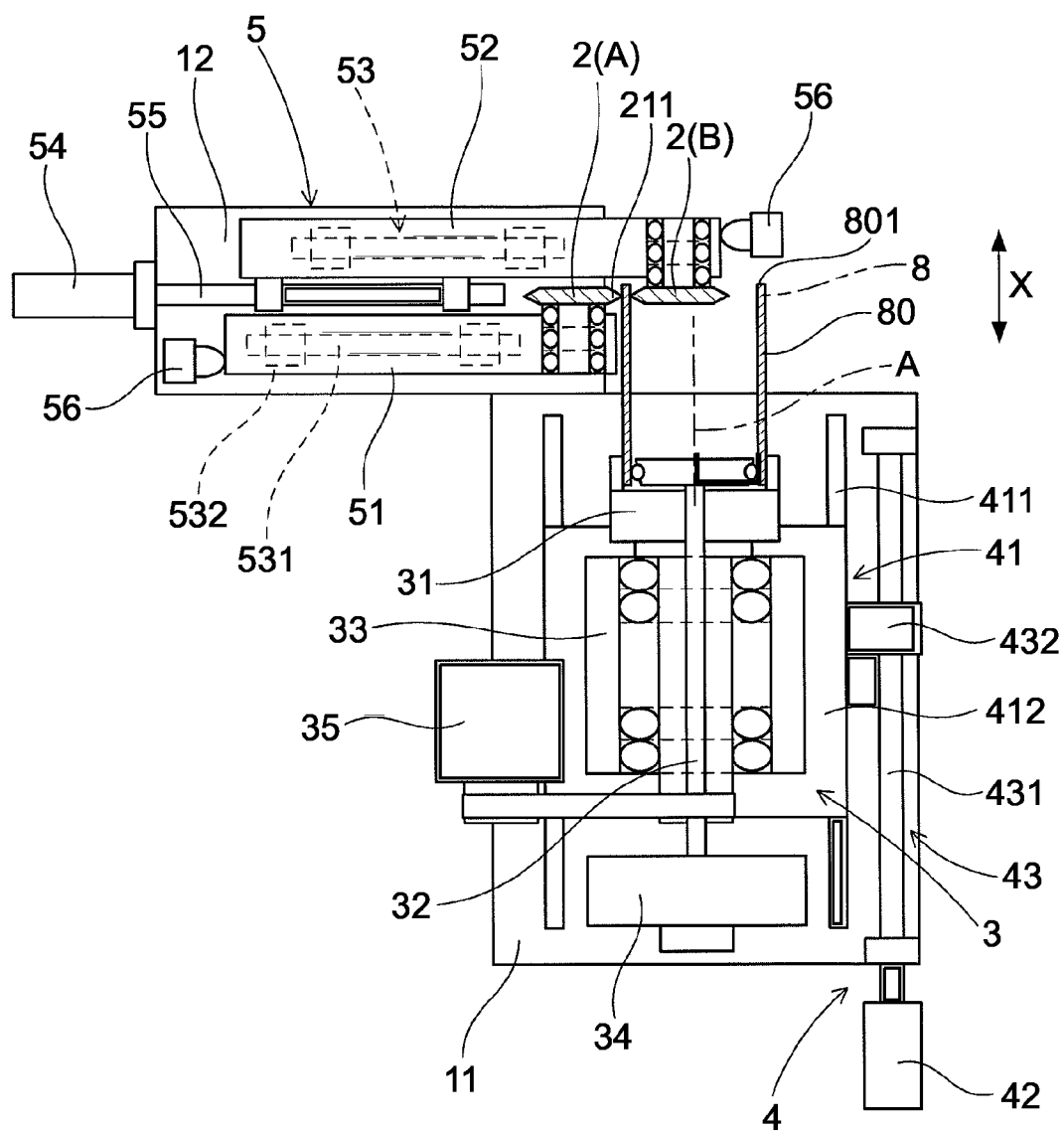
FIG. 2 is an illustration showing an entire rotary cutting apparatus according to the embodiment.

As shown in FIG. 2, the rotary cutting apparatus 1 of the present embodiment is configured to cut the cylindrical material 80 into a plurality of loop members 8 by rotating the cylindrical material 80 about its central axis A and driving the pair of cutting tools 2A, 2B into rotation according to the rotation of the cylindrical material 80.

Figure 3:
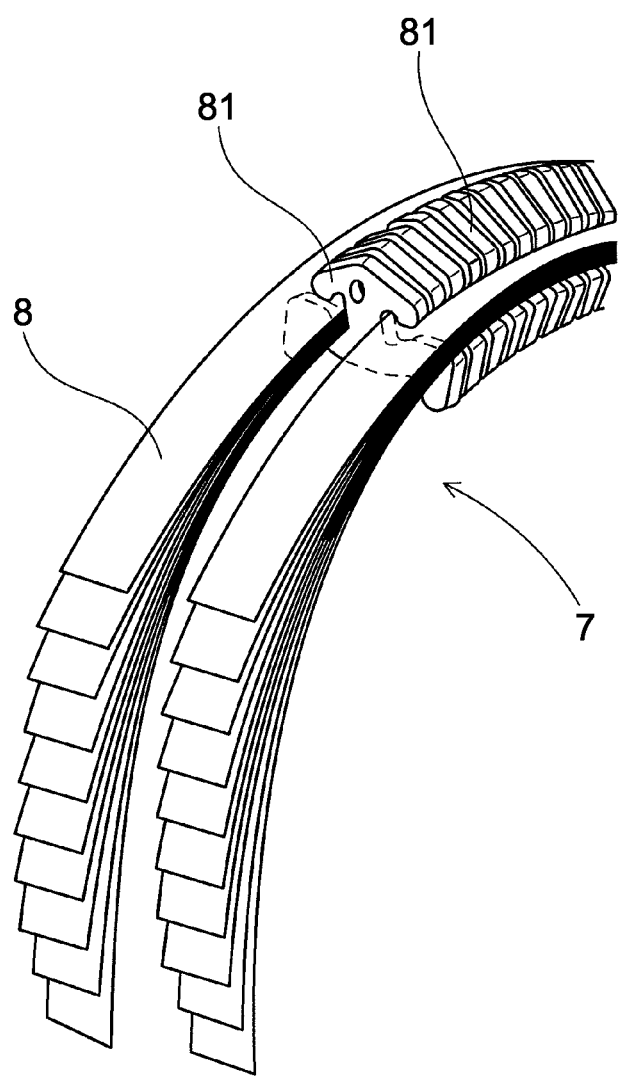
FIG. 3 is an illustration showing a CVT belt using loop members according to the embodiment.

As shown in FIG. 3, the cylindrical material 80 of the present embodiment is made of a steel plate formed in a cylindrical shape, and in the rotary cutting apparatus 1 and the rotary cutting method of the present embodiment, the loop members 8 for use in continuously variable transmissions (belt type CVTs) are formed from the cylindrical material 80. The CVT is formed by a pair of pulleys and a CVT belt 7 wound between the pair of pulleys. The loop members 8 are used for the CVT belt 7. The CVT belt 7 is formed by mounting a multiplicity of elements 81 as friction parts along the entire circumference of a stack of the multiple loop members 8. A pair of the stacks of the multiple loop members 8 are respectively wound on both sides of the elements 81.

As shown in FIG. 2, the rotary cutting apparatus 1 includes rotation holding means 3 for holding the cylindrical material 80 so that the cylindrical material 80 can rotate about the central axis A of the cylindrical material 80, cutting tool feed means 5 for holding the pair of cutting tools 2A, 2B so that the cutting tools 2A, 2B can spin, and relatively moving the pair of cutting tools 2A, 2B toward each other, and material feed means 4 for feeding the cylindrical material 80 held by the rotation holding means 3 by predetermined amounts in an axial direction X of the cylindrical material 80 (the direction of the central axis A).

The rotation holding means 3 includes a chuck portion 31 that holds the cylindrical material 80, a rotary spindle portion 32 coupled to the chuck portion 31, a bearing portion 33 that supports the rotary spindle portion 32 so that the rotary spindle portion 32 is rotatable, a rotational drive motor 34 that drives and rotates the rotation spindle portion 32 and the chuck portion 31, and a holding motor 35 that performs the holding operation of the chuck portion 31. The cylindrical material 80 is held by the chuck portion 31 according to the rotation of the holding motor 35, and the cylindrical material 80 held by the chuck portion 31 can be rotated according to the rotation of the rotational drive motor 34.

As shown in the figure, the material feed means 4 has a slide mechanism portion 41 that slides the entire rotation holding means 3, a material feed motor 42 that drives and slides the slide mechanism portion 41, and a conversion portion 43 that converts rotation output of the material feed motor 42 into linear output of the slide mechanism portion 41. The slide mechanism portion 41 includes a rail 411 fixed to a mount 11, and a slide base 412 that slides with respect to the rail 411. The conversion portion 43 is configured to convert the rotation output of the material feed motor 42 to linear output of a nut 432 that is tightened on a ball screw, trapezoidal screw, etc. 431. The slide base 412 having the nut 432 fixed thereto slides along the rail 411 according to the rotation of the material feed motor 42, whereby the entire rotation holding means 3 can be slid.

As shown in FIG. 2, the cutting tool feed means 5 has a first spin holding portion 51 that holds one of the pair of cutting tools 2A, 2B so that it can spin, a second spin holding portion 52 that holds the other cutting tool 2A, 2B so that it can spin, a movement mechanism portion 53 that moves the second spin holding portion 52 relative to the first spin holding portion 51, a cutting tool feed motor 54 that drives the movement mechanism portion 53, and a conversion portion 55 that coverts rotation output of the cutting tool feed motor 54 to linear output. In the movement mechanism portion 53, a rail 531 fixed to a mount 12 and a slide base 532 that slides with respect to the rail 531 are formed for each of the first spin holding portion 51 and the second spin holding portion 52 in order to slide the first spin holding portion 51 and the second spin holding portion 52.

The first spin holding portion 51 and the second spin holding portion 52 are biased by respective biasing members 56 in such a direction that the cutting tools 2 are moved toward each other. In the present embodiment, one of the pair of cutting tools 2A, 2B is the outer peripheral-side cutting tool 2A that is held by the first spin holding portion 51 so as to be able to spin and that is placed on the outer periphery of the cylindrical material 80, and the other cutting tool 2A, 2B is the inner peripheral-side cutting tool 2B that is held by the second spin holding portion 52 so as to be able to spin and that is placed on the inner periphery of the cylindrical material 80.

In the present embodiment, the second spin holding portion 52 can be moved with respect to the first spin holding portion 51 according to the rotation of the cutting tool feed motor 54, and a portion of the cylindrical material 80 in the circumferential direction C (see FIG. 1) can be sandwiched between the cutting blade 211 of the outer peripheral-side cutting tool 2A in the first spin holding portion 51 and the cutting blade 211 of the inner peripheral-side cutting tool 2B in the second spin holding portion 52 by the biasing force of each biasing member 56.

The rotary cutting apparatus 1 is configured to cut the cylindrical material 80 by rotating the cylindrical material 80 by the rotation holding means 3, moving the pair of cutting tools 2A, 2B toward each other by the cutting tool feed means 5, and driving the pair of cutting tools 2A, 2B into rotation according to the rotation of the cylindrical material 80.

Figure 4:
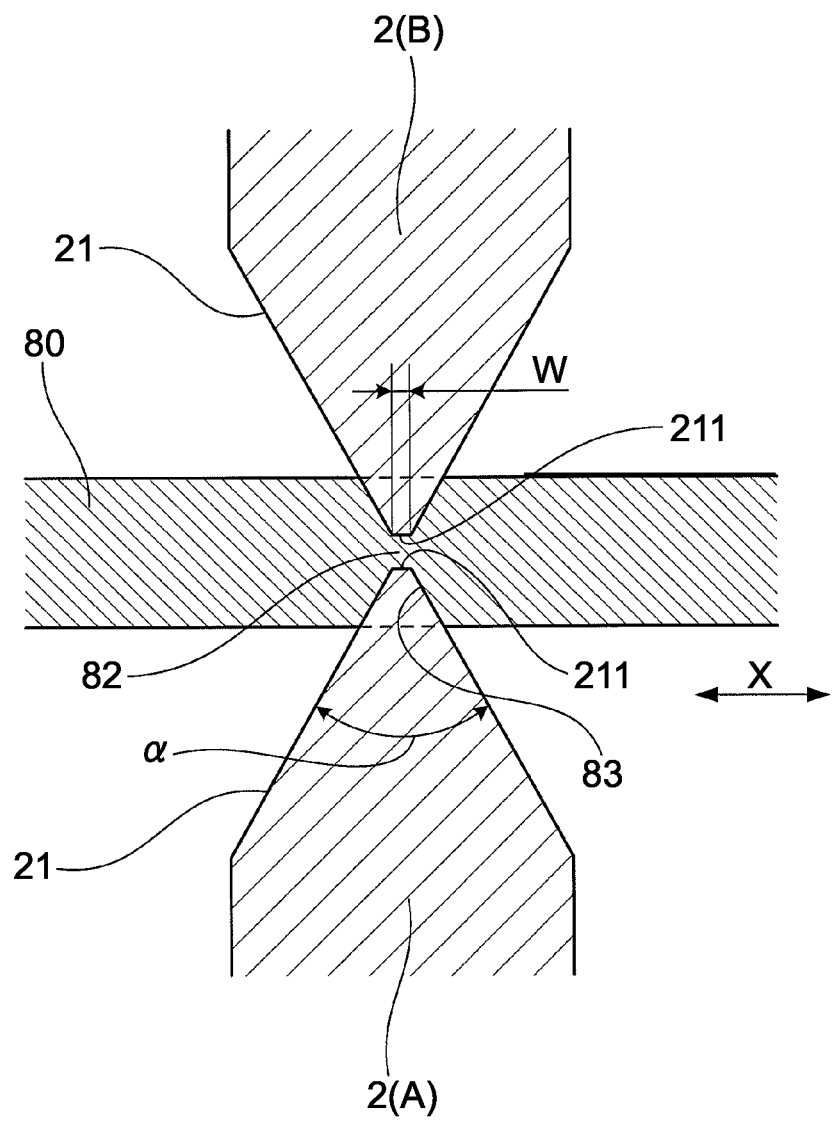
FIG. 4 is a sectional illustration showing the state where the cylindrical material is cut with the pair of cutting tools according to the embodiment, as viewed in a direction orthogonal to the axial direction of the cylindrical material.

As shown in FIG. 4, in the outer peripheral-side cutting tool 2A and the inner peripheral-side cutting tool 2B, an angle α between a pair of tilted surfaces of the outer peripheral portion 21 which form the mountain-shaped cross section can be 45 to 75°, and is preferably 55 to 65°, and the angle α of about 60° is appropriate.

The tip end of the cutting blade 211 of the outer peripheral-side cutting tool 2A and the tip end of the cutting blade 211 of the inner peripheral-side cutting tool 2B are formed to have flat surfaces. The tip ends of these cutting blades 211 may be formed to have rounded surfaces, namely surfaces with a round shape. Even if the tip ends of the cutting blades 211 are initially formed to have flat surfaces, these tip ends may be worn into rounded surfaces according to the frequency of use. The width W of the flat surfaces or the rounded surfaces can be, e.g., 0.02 to 0.1 mm.

In the present embodiment, as shown in FIG. 1, the diameter of the inner peripheral-side cutting tool 2B that is placed on the inner periphery of the cylindrical material 80 is larger than the inner radius of the cylindrical material 80 and is smaller than the inner diameter of the cylindrical material 80. The diameter of the outer peripheral-side cutting tool 2A is larger than that of the inner peripheral-side cutting tool 2B.

An angle θ of the second imaginary line L2 connecting the axial center (central axis) A of the cylindrical material 80 and the axial center O2 of the inner peripheral-side cutting tool 2B with respect to the first imaginary line L1 connecting the axial center A of the cylindrical material 80 and the axial center O1 of the outer peripheral-side cutting tool 2A is in the range of 2 to 21°.

In FIG. 1, the rotation direction of the cylindrical material 80 is opposite to the direction in which the second imaginary line L2 is shifted in the circumferential direction C with respect to the first imaginary line L1. However, the rotation direction of the cylindrical material 80 may be the same as the direction in which the second imaginary line L2 is shifted in the circumferential direction C with respect to the first imaginary line L1.

A distance Z from a position P1 on the inner peripheral surface of the cylindrical material 80 which is located on the first imaginary line L1 connecting the axial center A of the cylindrical material 80 and the axial center O1 of the outer peripheral-side cutting tool 2A to a contact center point P2 of the inner peripheral-side cutting tool 2B at which the cutting blade 211 of the inner peripheral-side cutting tool 2B contacts the inner periphery of the cylindrical material 80 can be in the range of 0.5 to 5 mm.

Although not shown in the figure, the outer peripheral-side cutting tool 2A may be formed in an annular shape that surrounds the outer periphery of the cylindrical material 80 and faces the inner peripheral-side cutting tool 2B.

As shown in FIG. 2, in the rotary cutting method in which the cylindrical material 80 is cut by using the rotary cutting apparatus 1, the cylindrical material 80 is held by the rotation holding means 3, and is fed in the axial direction X from an axial end face 801 of the cylindrical material 80 by the material feed means 4 by an amount corresponding to the width of the loop member 8 to be formed. Then the cylindrical material 80 is rotated about its axial center A by the rotation holding means 3, and the outer peripheral-side cutting tool 2A and the inner peripheral-side cutting tool 2B are gradually moved toward each other by the cutting tool feed means 5. When brought into contact with the cylindrical material 80, the outer peripheral-side cutting tool 2A and the inner peripheral-side cutting tool 2B starts to be driven into rotation according to the rotation of the cylindrical material 80. Thus, the cutting blade 211 of the outer peripheral-side cutting tool 2A gradually cuts into the outer periphery of the cylindrical material 80, and the cutting blade 211 of the inner peripheral-side cutting tool 2B gradually cuts into the inner periphery of the cylindrical material 80. At this time, the rate at which the cutting blade 211 of the outer peripheral-side cutting tool 2A cuts into the cylindrical material 80 can be made to be approximately the same as that at which the cutting blade 211 of the inner peripheral-side cutting tool 2B cuts into the cylindrical material 80.

As shown in FIG. 4, in a cut portion 82 along the entire circumference of the cylindrical material 80, a V-shaped groove 83 is gradually formed in both inner and outer peripheries along the entire circumference of the cylindrical material 80. The cylindrical material 80 is rotated about its axial center A a plurality of times with respect to the outer peripheral-side cutting tool 2A and the inner peripheral-side cutting tool 2B. The cylindrical material 80 is thus cut to form the loop member 8 with a predetermined width.

Then the cylindrical material 80 is again fed in the axial direction X by the material feed means 4 by the amount corresponding to the width of the loop member 8 to be formed. The loop member 8 can thus be repeatedly formed in a manner similar to that described above.

Figure 5:
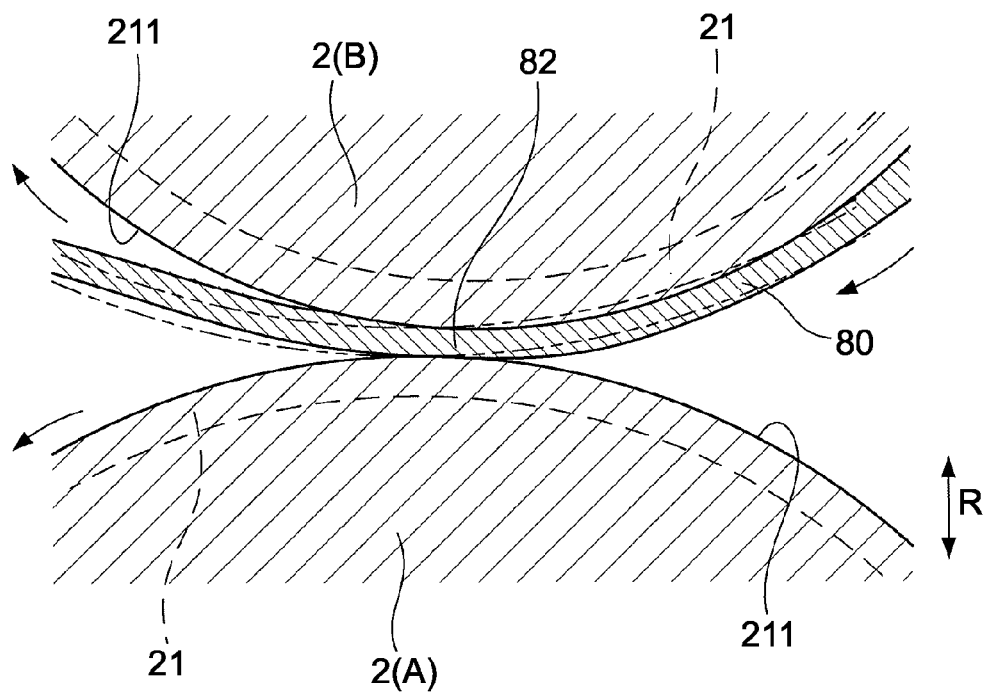
FIG. 5 is a sectional illustration schematically showing deformation of the cylindrical material according to the embodiment, as viewed in the axial direction of the cylindrical material.
Figure 6:
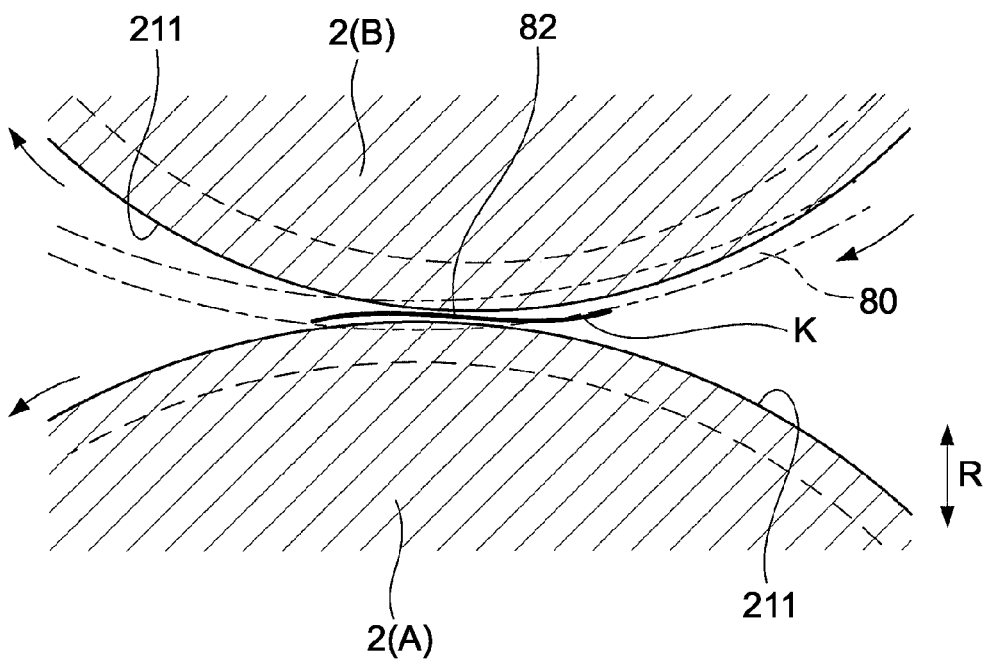
FIG. 6 is a sectional illustration schematically showing, by using an imaginary line, a deformation force that is applied to the cylindrical material according to the embodiment.
Figure 7:
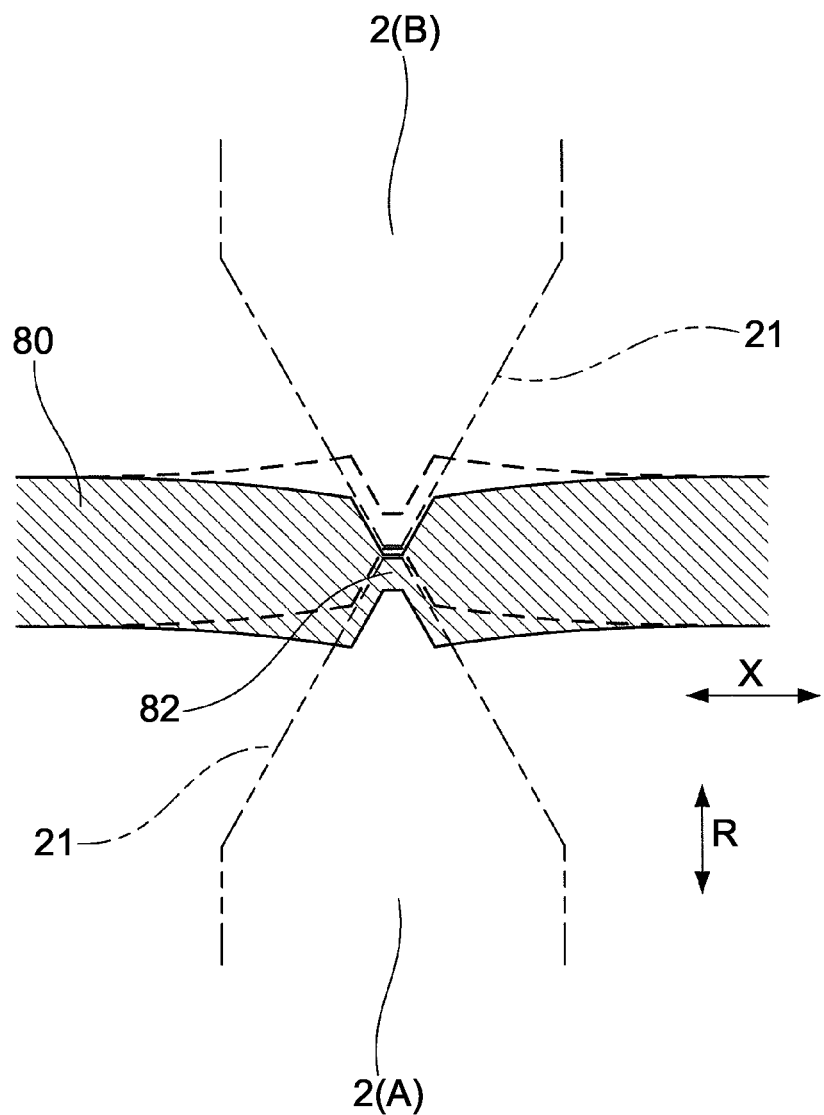
FIG. 7 is a sectional illustration schematically showing deformation of the cylindrical material according to the embodiment as viewed in the direction orthogonal to the axial direction of the cylindrical material.

FIGS. 5 to 7 schematically show deformation of the cylindrical material 80 which is caused by the cutting blades 211 of the pair of cutting tools 2A, 2B of the present embodiment when the cylindrical material 80 is cut. FIG. 5 schematically shows deformation of the cylindrical material 80 which is caused by the pair of cutting tools 2A, 2B, as viewed in the axial direction X of the cylindrical material 80, and FIG. 6 schematically shows, by using an imaginary line K, a deformation force (bending force) that is applied to the cylindrical material 80. FIG. 7 shows, in cross section, deformation of the cylindrical material 80 as viewed in a direction orthogonal to the axial direction X of the cylindrical material 80.

Figure 8:
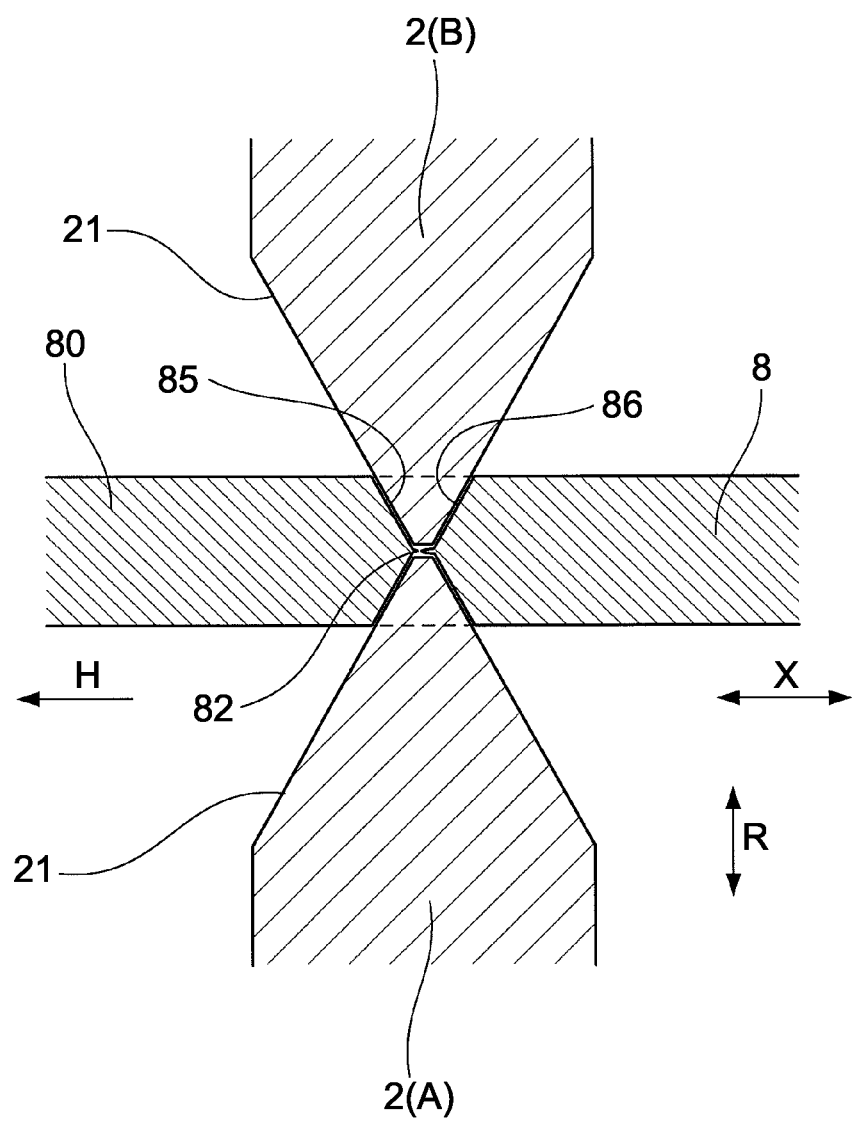
FIG. 8 is a sectional illustration showing the state where the cylindrical material has been cut according to the embodiment, as viewed in the direction orthogonal to the axial direction of the cylindrical material.

FIG. 8 shows, in cross section, the state where the cylindrical material 80 has been cut, as viewed in the direction orthogonal to the axial direction X of the cylindrical material 80.

As shown in FIG. 6, the cut portion 82 of the cylindrical material 80 which is sandwiched between the pair of cutting tools 2A, 2B is subjected to such a bending force that deforms the cut portion 82 into a wave shape having an S-shape (imaginary line K) in a radial direction R of the cut portion 82. That is, as shown in FIGS. 5 and 7, the cut portion 82 of the cylindrical material 80 can be elastically deformed in the radial direction R even if deformation in the axial direction X is restricted. As shown in FIG. 8, this can minimize the difference between an end face shape 85 that is formed in the tip end of the cylindrical material 80 and an end face shape 86 that is formed in the side which is cut off of the cylindrical material 80 (the side of the loop member 8 which is cut off). This can significantly reduce the amount of polishing that is performed to make both end faces of the cut loop member 8 have the same shape.

Since the cut portion 82 of the cylindrical material 80 is subjected to such a bending force that deforms the cut portion 82 into a wave shape having an S-shape in the radial direction R of the cut portion 82, a maximum load that is applied to each cutting blade 211 of the pair of cutting tools 2A, 2B can be reduced. Moreover, since this bending force is repeatedly applied to the cylindrical material 80 in the end stage of the cutting operation, the cylindrical material 80 can be cut off before the cutting blades 211 of the pair of cutting tools 2A, 2B contact each other. This can prolong the life of the pair of cutting tools 2A, 2B.

Figure 9:
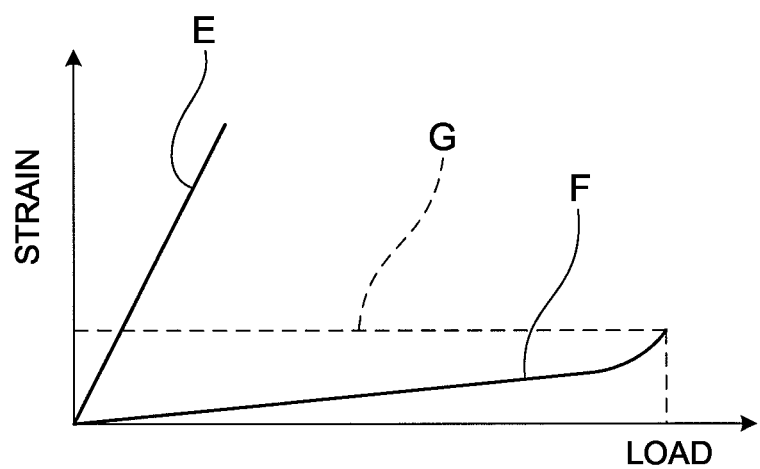
FIG. 9 is a graph schematically showing the relation between a load that is applied to a cut tip end of the cylindrical material and a strain that is caused in the cut tip end of the cylindrical material according to the embodiment, where the abscissa indicates the load, and the ordinate indicates the strain.

FIG. 9 schematically shows the relation between a load that is applied to the tip end side of the cylindrical material 80 (the side restrained by a rotation holding jig) when the cylindrical material 80 is cut with the pair of cutting tools 2A, 2B and a strain that is caused in the cut portion 82 of the cylindrical material 80, where the abscissa indicates the load, and the ordinate indicates the strain. Broken line G represents the strain that is required to make the end face shapes 85, 86 on both sides of the cylindrical material 80 be the same.

In this figure, in the case where the first imaginary line L1 connecting the axial center A of the cylindrical material 80 and the axial center O1 of the outer peripheral-side cutting tool 2A is aligned with the second imaginary line L2 connecting the axial center A of the cylindrical material 80 and the axial center O2 of the inner peripheral-side cutting tool 2B in the circumferential direction C of the cylindrical material 80, only a slight strain is caused in the cut portion 82 of the cylindrical material 80 even if a large load is applied from the pair of cutting tools 2A, 2B in the direction in which the cylindrical material 80 is cut, as shown by line F. Accordingly, in order the strain that is caused on the tip end side of the cylindrical material 80 is increased, a large force needs to be applied in the direction in which the pair of cutting tools 2A, 2B are moved toward to each other by the cutting tool feed means 5. The allowable load of the rotary cutting apparatus 1 therefore needs to be increased.

Figure 10:
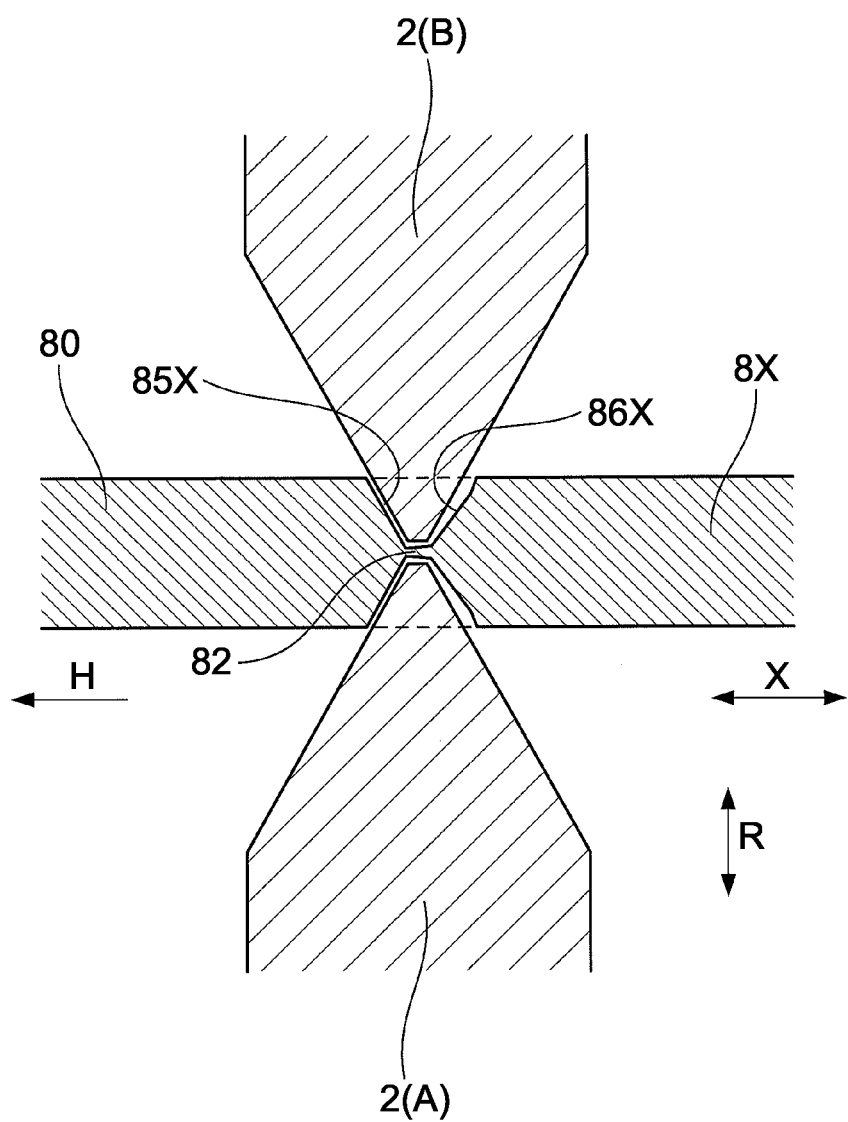
FIG. 10 is a sectional illustration showing the state where the cylindrical material has been cut, as viewed in the direction orthogonal to the axial direction of the cylindrical material, in the case where a first imaginary line is aligned with a second imaginary line in a circumferential direction of the cylindrical material according to a comparative example.

FIG. 10 schematically shows deformation of the cylindrical material 80 which is caused by the cutting blades 211 of the pair of cutting tools 2A, 2B in the case where the first imaginary line L1 is aligned with the second imaginary line L2 in the circumferential direction C. In this case, an end face shape 85X that is formed in the tip end of the cylindrical material 80 is different from an end face shape 86X that is formed in the side which is cut off of the cylindrical material 80. That is, the side which is cut off of the cylindrical material 80 can be freely deformed in the axial direction X (the direction of the central axis A), whereas the tip end of the cylindrical material 80 can hardly be deformed in the axial direction X. Thus, the end face shape 86X that is formed in the side which is cut off of the cylindrical material 80 is more elongated than the end face shape 85X that is formed in the tip end of the cylindrical material 80. This requires a large amount of polishing in order to make both end faces of the cut loop member 8X have the same shape.

On the other hand, in the case where the first imaginary line L1 is shifted from the second imaginary line L2 in the circumferential direction C, the strain that is caused in the cut portion 82 of the cylindrical material 80 (especially the strain that is caused in the tip end of the cylindrical material 80) can be increased even if the load is reduced which is applied from the pair of cutting tools 2A, 2B in the direction in which the cylindrical material 80 is cut, as shown by line E in FIG. 9. Accordingly, the force that needs to be applied in the direction in which the pair of cutting tools 2A, 2B are moved toward each other by the cutting tool feed means 5 can be reduced, and the allowable load of the rotary cutting apparatus 1 can be reduced.

According to the rotary cutting apparatus 1 and the rotary cutting method of the present embodiment, the amount of polishing that is performed to make both end faces of the cut loop member 8 have the same shape can therefore be significantly reduced, and the life of the pair of cutting tools 2A, 2B can be prolonged.

As shown in FIG. 8, the rotary cutting apparatus 1 may be configured to cut off the cylindrical material 80 by separating the cylindrical material 80 from the pair of cutting tools 2A, 2B in the axial direction X by withdrawing the rotation holding means 3 with respect to the pair of cutting tools 2A, 2B before the cutting blades 211 of the pair of cutting tools 2A, 2B contact each other during cutting of the cylindrical material 80. Arrow H represents the direction in which the rotation holding means 3 and the cylindrical material 80 are withdrawn.

In this case, the rotation holding means 3 may gradually withdraw the cylindrical material 80 in the direction in which the cylindrical material 80 is separated from the pair of cutting tools 2A, 2B, according to the cutting amount of the pair of cutting tools 2A, 2B. The rotation holding means 3 may instantaneously withdraw the cylindrical material 80 in the direction in which the cylindrical material 80 is separated from the pair of cutting tools 2A, 2B, when the thickness of the cut portion 82 cut by the pair of cutting tools 2A, 2B reaches a predetermined value.

The invention claimed is:

1. A rotary cutting apparatus comprising:
a pair of cutting tools each having a cutting blade along a tip end of its outer peripheral portion having a substantially V-shaped cross section when viewed in a circumferential direction of the cutting tools, in which the rotary cutting apparatus is configured to cut a cylindrical material into pieces with a predetermined width by sandwiching the cylindrical material between the outer peripheral portions of the cutting blades of the pair of cutting tools so that the cutting blades are respectively placed on inner and outer peripheries of the cylindrical material, and relatively rotating and moving the pair of cutting tools along an entire circumference of the cylindrical material, the substantially V-shaped cross section being symmetrical about a radial direction of the cutting tools and tilted surfaces forming the V-shaped cross section converge at the tip end, wherein
the rotary cutting apparatus is configured to cut the cylindrical material in a state where a second imaginary line connecting an axial center of the cylindrical material and an axial center of an inner peripheral-side cutting tool as one of the pair of cutting tools which is placed on the inner periphery of the cylindrical material is shifted in a circumferential direction of the cylindrical material about the axial center of the cylindrical material with respect to a first imaginary line connecting the axial center of the cylindrical material and an axial center of an outer peripheral-side cutting tool as the other cutting tool that is placed on the outer periphery of the cylindrical material and the respective face portions of the pair of cutting tools are aligned at a same axial direction of the cylindrical material and configured to sandwich the cylindrical material.

2. The rotary cutting apparatus according to claim 1, further comprising:
a rotation holder that holds the cylindrical material so that the cylindrical material can rotate about a central axis of the cylindrical material, and a cutting tool feeding part that holds the pair of cutting tools so that each of the cutting tools can spin, and that relatively moves the pair of cutting tools toward each other, wherein the rotary cutting apparatus cuts the cylindrical material by rotating the cylindrical material by the rotation holder, moving the pair of cutting tools toward each other by the cutting tool feeding part, and driving the pair of cutting tools into rotation according to the rotation of the cylindrical material.

3. The rotary cutting apparatus according to claim 2, wherein the tip end of each cutting blade of the pair of cutting tools is formed to have a flat surface or a rounded surface, and the rotary cutting apparatus cut off the cylindrical material by relatively separating the pair of cutting tools and the rotation holder in an axial direction of the cylindrical material before the cutting blades of the pair of cutting tools contact each other during cutting of the cylindrical material.

4. The rotary cutting apparatus according to claim 1, wherein an angle of the second imaginary line with respect to the first imaginary line is in a range of 2 to 21°.

5. A rotary cutting method in which a cylindrical material is cut into pieces with a predetermined width, comprising:

sandwiching the cylindrical material between outer peripheral portions of cutting blades of a pair of cutting tools, each having the cutting blade along a tip end of its outer peripheral portion having a substantially V-shaped cross section when viewed in a circumferential direction of the cutting tools so that the cutting blades are respectively placed on inner and outer peripheries of the cylindrical material the substantially V-shaped cross section being symmetrical about a radial direction of the cutting tools and tilted surfaces forming the V-shaped cross section converge at the tip end; and relatively rotating and moving the pair of cutting tools along an entire circumference of the cylindrical material, wherein the cylindrical material is cut in a state where a second imaginary line connecting an axial center of the cylindrical material and an axial center of an inner peripheral-side cutting tool as one of the pair of cutting tools which is placed on the inner periphery of the cylindrical material is shifted in a circumferential direction of the cylindrical material about the axial center of the cylindrical material with respect to a first imaginary line connecting the axial center of the cylindrical material and an axial center of an outer peripheral-side cutting tool as the other cutting tool that is placed on the outer periphery of the cylindrical material and the respective face portions of the pair of cutting tools are aligned at a same axial direction of the cylindrical material and configured to sandwich the cylindrical material.

6. The rotary cutting method according to claim 5, further comprising:

using a rotation holder that holds the cylindrical material so that the cylindrical material can rotate about a central axis of the cylindrical material, and a cutting tool feeding part that holds the pair of cutting tools so that the cutting tools can spin, and that relatively moves the pair of cutting tools toward each other, wherein the cylindrical material is cut by rotating the cylindrical material by the rotation holder, moving the pair of cutting tools toward each other by the cutting tool feeding part, and driving the pair of cutting tools into rotation according to the rotation of the cylindrical material.

7. The rotary cutting method according to claim 6, wherein the tip end of each cutting blade of the pair of cutting tools is formed to have a flat surface or a rounded surface, and the cylindrical material is cut off by relatively separating the pair of cutting tools and the rotation holder in an axial direction of the cylindrical material before the cutting blades of the pair of cutting tools contact each other during cutting of the cylindrical material.

8. The rotary cutting method according to claim 5, wherein an angle of the second imaginary line with respect to the first imaginary line is in a range of 2 to 21°.

\* \* \* \* \*